US009339428B2

(12) United States Patent
Day, Jr.

(10) Patent No.: US 9,339,428 B2
(45) Date of Patent: May 17, 2016

(54) MOTOR VEHICLE WITH WHEELCHAIR CADDY

(71) Applicant: Roy E. Day, Jr., Decatur, GA (US)

(72) Inventor: Roy E. Day, Jr., Decatur, GA (US)

( * ) Notice: Subject to any disclaimer, the term of this patent is extended or adjusted under 35 U.S.C. 154(b) by 0 days.

(21) Appl. No.: 14/449,891

(22) Filed: Aug. 1, 2014

(65) Prior Publication Data

US 2015/0104281 A1 Apr. 16, 2015

Related U.S. Application Data

(60) Provisional application No. 61/861,875, filed on Aug. 2, 2013.

(51) Int. Cl.
| | |
|---|---|
| *B62K 27/00* | (2006.01) |
| *A61G 3/08* | (2006.01) |
| *A61G 3/06* | (2006.01) |
| *B62K 3/16* | (2006.01) |

(52) U.S. Cl.
CPC ............. *A61G 3/0808* (2013.01); *A61G 3/061* (2013.01); *B62K 3/16* (2013.01); *B62K 27/00* (2013.01); *A61G 2220/18* (2013.01); *A61G 2220/20* (2013.01); *Y10T 29/49622* (2015.01)

(58) Field of Classification Search
CPC ........... Y10S 414/134; A61G 2220/18; A61G 3/0808; B62K 27/00; B62K 3/16
USPC ........................................................ 414/921
See application file for complete search history.

(56) References Cited

U.S. PATENT DOCUMENTS

| | | | | | |
|---|---|---|---|---|---|
| 4,221,276 | A | * | 9/1980 | Mitchell et al. | 180/209 |
| 4,415,056 | A | * | 11/1983 | Smith | 180/210 |
| 4,580,652 | A | * | 4/1986 | Turner et al. | 180/210 |
| 4,961,477 | A | * | 10/1990 | Sweeney | 180/219 |
| 5,299,652 | A | * | 4/1994 | Bevins | 180/219 |
| 5,431,524 | A | * | 7/1995 | Antal et al. | 414/537 |

OTHER PUBLICATIONS

Biker with LGMD article, Jul. 20, 2010 available at http://quest.mda.org/news/biker-lgmd-creates-his-own-accessible-motorcycle.*
Str8shot pictures, Jun. 28, 2011, available at http://www.str8shot.com/gallery.html.*
F2MCLTD How to fit a sidecar, Aug. 10, 2011, available at http://f2mcltd.blogspot.com/2011/08/how-to-fit-sidecar.html.*
The Brothers Sidecar, Mar. 5, 2012, available at http://www.3wheels.org/outfit-reviews/sidecar2/the-brothers-sidecar/.*

* cited by examiner

*Primary Examiner* — Saul Rodriguez
*Assistant Examiner* — Mark Hageman
(74) *Attorney, Agent, or Firm* — Womble Carlyle Sandridge & Rice LLP

(57) ABSTRACT

An apparatus for a wheelchair caddy to be attached to a disabled rider adapted cycle or scooter that may include connectors connecting the caddy and cycle, a rear or double rear axle attached to the base of the caddy frame, a handle for the user to grip while pulling the wheelchair onto the caddy, a rod as an emergency brake, a ratcheting strap or straps and bungee cord for securing the wheelchair in the caddy, walled footwells for the securing the passengers feet, a secured foam rubber middle console, a fitted, padded back rest, thigh restraining straps, lower ribcage restraining straps and other features.

27 Claims, 10 Drawing Sheets

MOTOR VEHICLE WITH WHEELCHAIR CADDY

CROSS-REFERENCE TO RELATED APPLICATIONS

This application claims the benefit of U.S. Provisional Application No. 61/861,875, filed Aug. 2, 2013, which is incorporated herein by reference in its entirety.

FIELD OF THE INVENTION

The present disclosure relates generally to the field of motorized vehicles, including motorcycles, scooters, and the like. More specifically, the present disclosure relates to adaptations and accessories to make a vehicle more accessible and usable for a disabled person.

BACKGROUND OF THE INVENTION

The use of motorcycles, scooters, and other, similar vehicles has grown since their introduction, and they have become even more popular as a means of transportation or for recreational purposes in recent years. In the past, however, motor scooters, motorcycles, etc., typically have been limited to use primarily by able-bodied riders. It has been estimated that close to 1% of the world's population now uses a wheelchair as a main source of mobility. Just as a significant portion of the non-disabled population prefers to ride a motorcycle or scooter instead of another vehicle, many wheelchair users around the world also would like to use a motorcycle or scooter when travelling, as an alternative transport, or for recreation, to be able to experience the freedom, agility and joy these vehicles can provide.

A primary problem with most conventional scooters or cycles is, however, that a disabled rider cannot easily bring his or her wheelchair along when riding, and often cannot easily transfer between a wheelchair and a scooter or cycle without assistance. Further, while specialty cycles have been produced, they typically have been very expensive to design and produce. Further, it has been difficult to adapt conventional scooters or cycles for easy/convenient use by a disabled rider.

Accordingly, it can be seen that a need exists for a system and method of adapting a motor vehicle such as a motorcycle, motor scooter, or the like, for use by disabled riders that addresses the foregoing and other related and unrelated problems in the art.

SUMMARY OF THE INVENTION

In one embodiment, the present disclosure is directed to a disabled rider adapted vehicle, such as a motor scooter, motorcycle or other, similar vehicle adapted to provide accessibility and use by disabled people, including paraplegics, amputees missing one or both legs, and generally anyone using a wheelchair that has sufficient upper body function. For example, in one embodiment, a conventional motorcycle, motor scooter, or other, similar vehicle can be converted into a disabled rider adapted cycle, referred to hereinafter as a "DRAC" or "DRAS." Such disabled rider adapted cycles are designed to help compensate for lack of mobility in one or more extremities of the rider.

The apparatus of the present disclosure further is designed as an improvement, modification and/or additional component that can be quickly and easily adapted to use with a conventional motor scooter or cycle, and includes a series of adaptations or features, including a caddy that can be connected to the cycle or scooter. The terms "cycle" or "scooter" are intended for convenience only and are not intended to be limiting to a specific type or types of vehicle. The terms "cycle" and "vehicle" as used herein could include a bike, cycle, scooter, tricycle, any type of single passenger vehicle, any type of small sized vehicle, other vehicle, motorized or not motorized, or the like. The present disclosure also includes a process to make such vehicles accessible and usable to a large number and variety of disabled people who previously would not have been able to use such a vehicle.

The caddy of the present disclosure may be attached to a conventional vehicle, such as a motorcycle, and can be capable of securing and transporting a wheelchair. The caddy also may be configured with features to facilitate the user in transferring from their wheelchair onto a seat portion of the cycle, to aid in the control, steering, or operation of the cycle, and to support or act as a brake for the adapted vehicle and caddy. The caddy thus enables a disabled person to conveniently transport his or her wheelchair while riding comfortably and safely, and to further mount and dismount from the vehicle easily and substantially without requiring assistance.

By way of example, a motorcycle, having at least one seat, driving controls including power and braking controls, a transmission located on handlebars that control steering by movement of a front wheel, and an engine, generally driving a rear wheel, can be converted by attaching the caddy and supporting alterations thereto. Such alterations can include adding pads, straps, footwells, a back rest, a connecting mechanism for attaching a caddy, and optional additional seatbelts or redundant safety straps. The caddy can include a handle, a brake, an axle or double axle, a rear wheel or wheels, a wheelchair securing mechanism such as a ratcheting strap, bungee cord or the like, or cut-outs, ballast or counterweights, a connecting mechanism, and an optional ramp and ramp control mechanism. For some types of DRACs, additional alterations including a heat shield and additional pads may be used due to the heat and exhaust produced by the cycle or scooter.

According to the present disclosure, a disabled person is able to ride his or her wheelchair onto the caddy of a DRAC or an improved cycle, secure his or her wheelchair to the caddy, transfer to the seat of the cycle, travel to a destination while transporting the wheelchair in the attached caddy, transfer back to the wheelchair, and thereafter release and ride the wheelchair off of the caddy. The disabled rider adapted vehicle of the present disclosure therefore is designed to overcome challenges present for disabled riders using all types of conventional cycles, such as lack of space to stow a wheelchair, possible difficulty mounting and dismounting, lack of mobility in one or more appendages, and need for additional operating and safety mechanisms.

Various objects, features and advantages of the present invention will become apparent to those skilled in the art upon a review of the following detailed description when taken in conjunction with the accompanying drawings.

Those skilled in the art will appreciate and understand that, according to common practice, the various features of the drawings discussed below are not necessarily drawn to scale, and that the dimensions of various features and elements of the drawings may be expanded or reduced to more clearly illustrate the embodiments of the present invention described herein.

DETAILED DESCRIPTION

Figure 1:
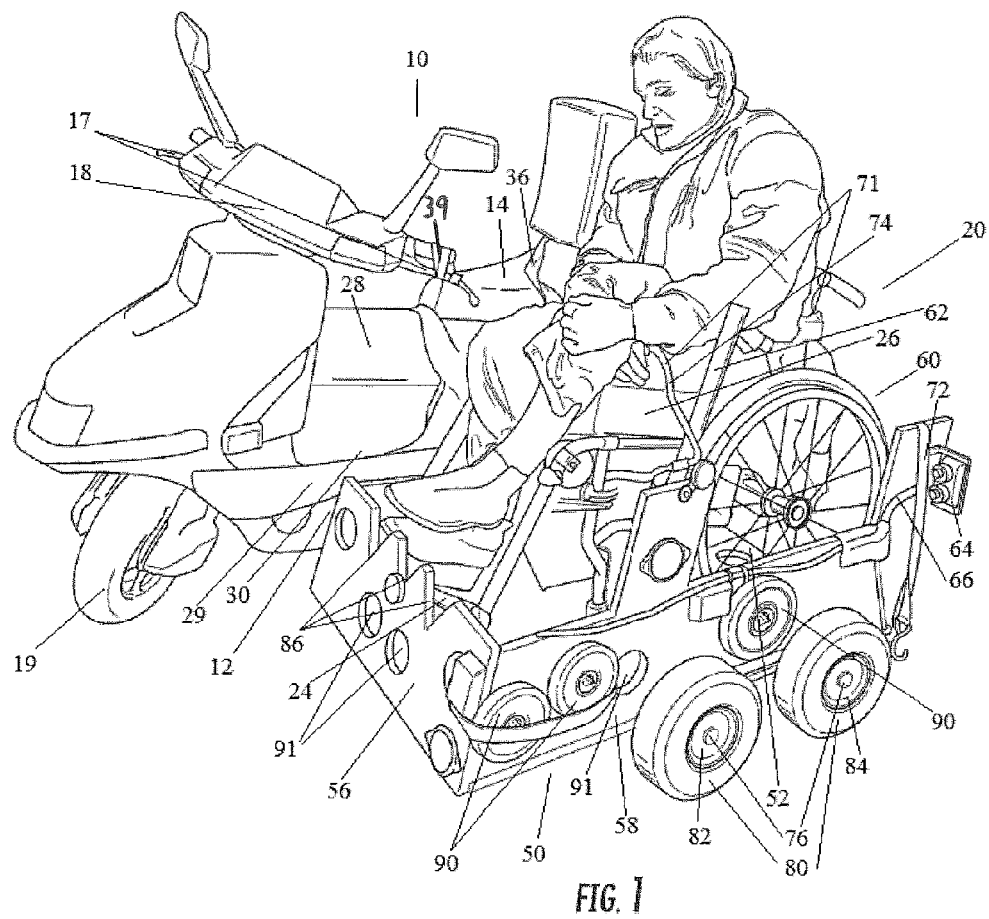
FIG. 1 is a perspective view of one embodiment of a disabled rider adapted vehicle, shown as a motor scooter or cycle with an attached caddy, according to the principles of the present disclosure.
Figure 2:
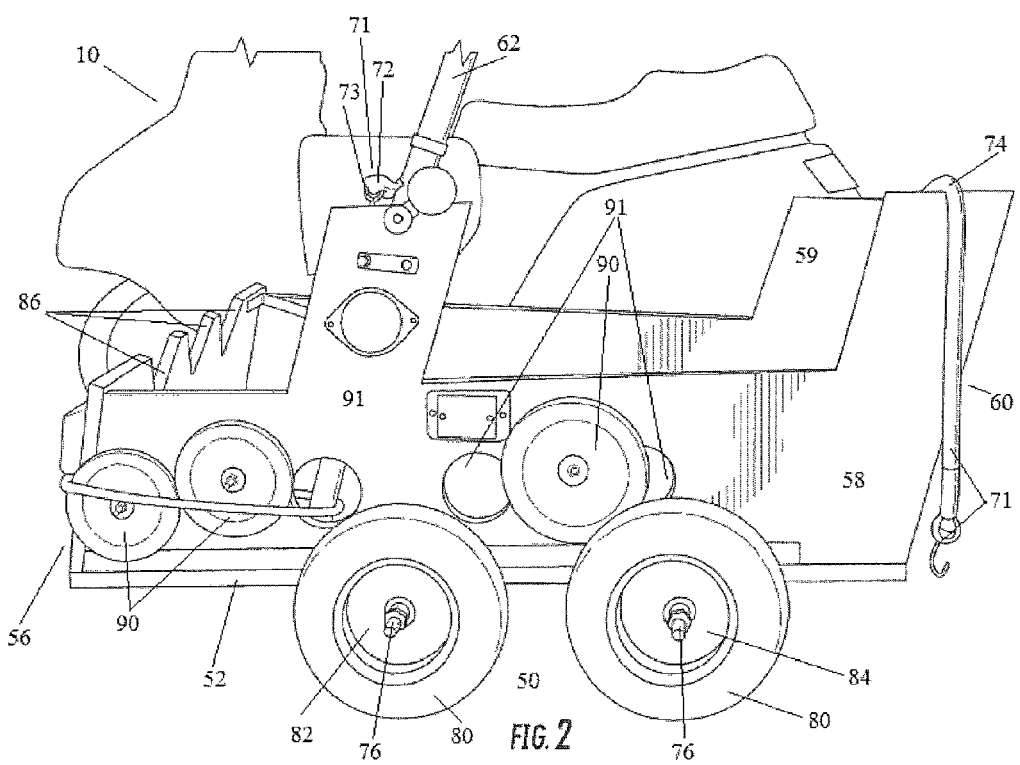
FIG. 2 is side view of the caddy of FIG. 1.
Figure 3:
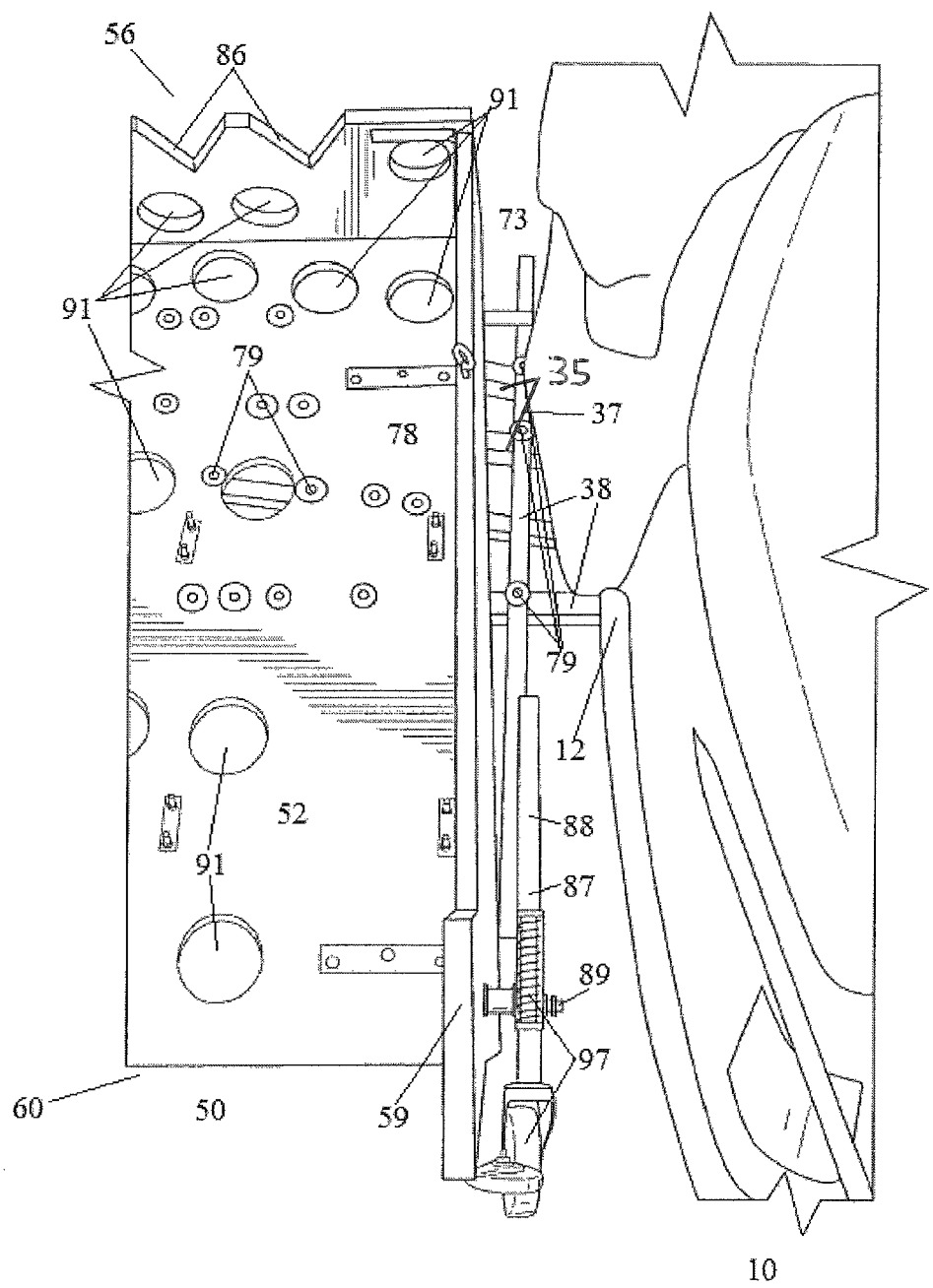
FIG. 3 is a close-up view of the inner sides of the disabled rider adapted vehicle and connected caddy of FIG. 1.
Figure 4:
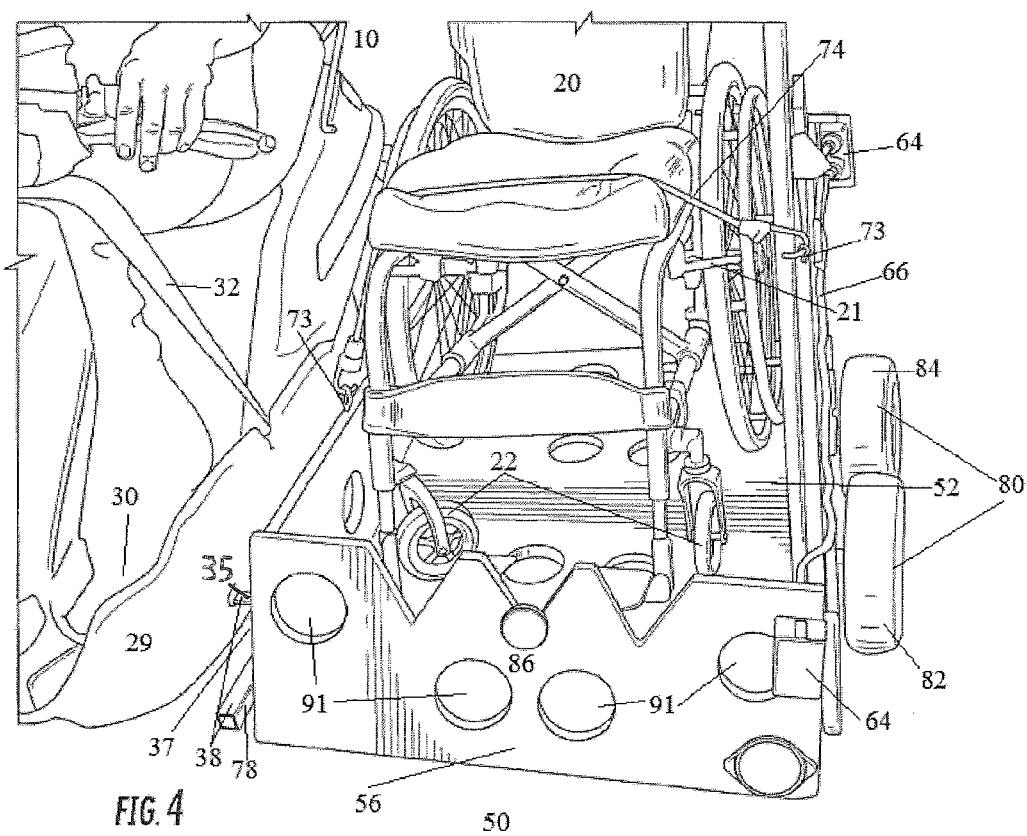
FIG. 4 is a close-up view of a wheelchair secured in the caddy of FIGS. 1-3.
Figure 5:
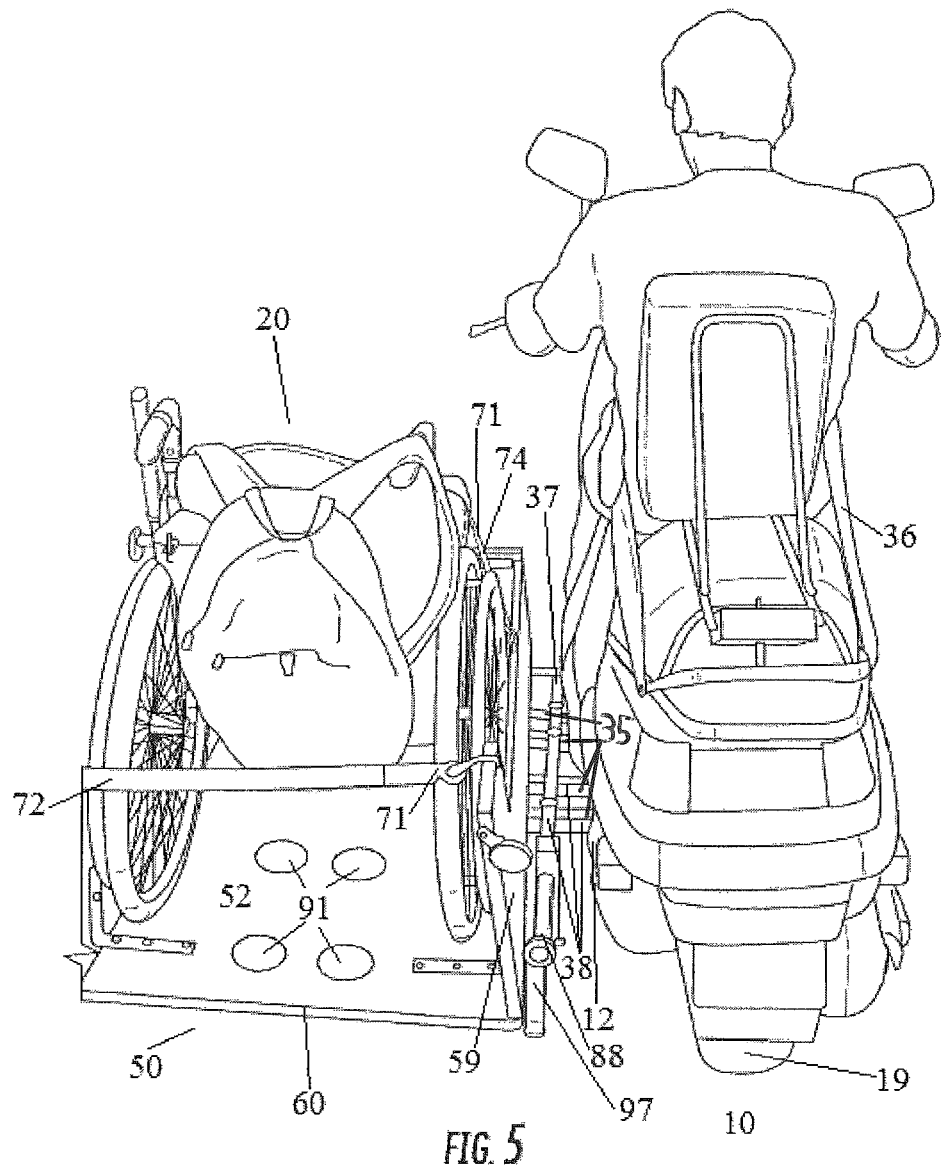
FIG. 5 is a rear view of the disabled rider adapted vehicle and connected caddy with a wheelchair secured.
Figure 6:
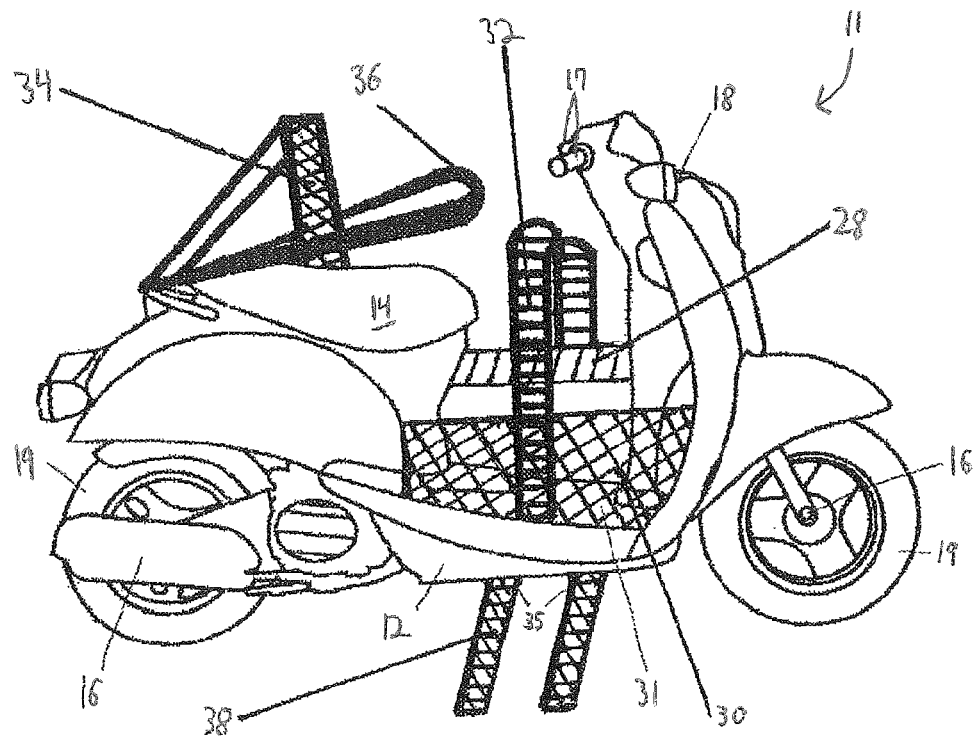
FIG. 6 is a side view of the disabled rider adapted vehicle.
Figure 7:
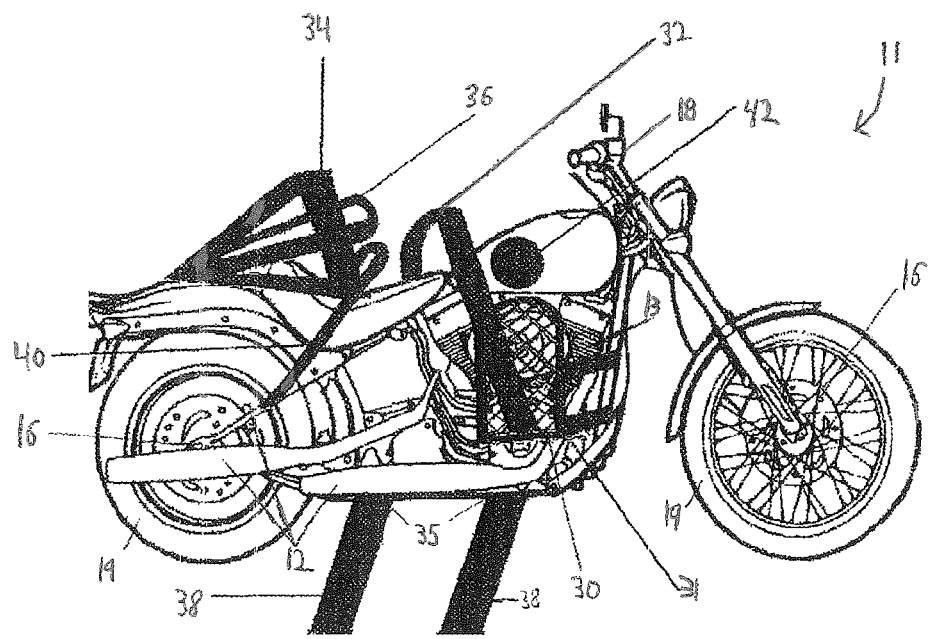
FIG. 7 is a side view of the disabled rider adapted vehicle with an optional lap belt.
Figure 8A:
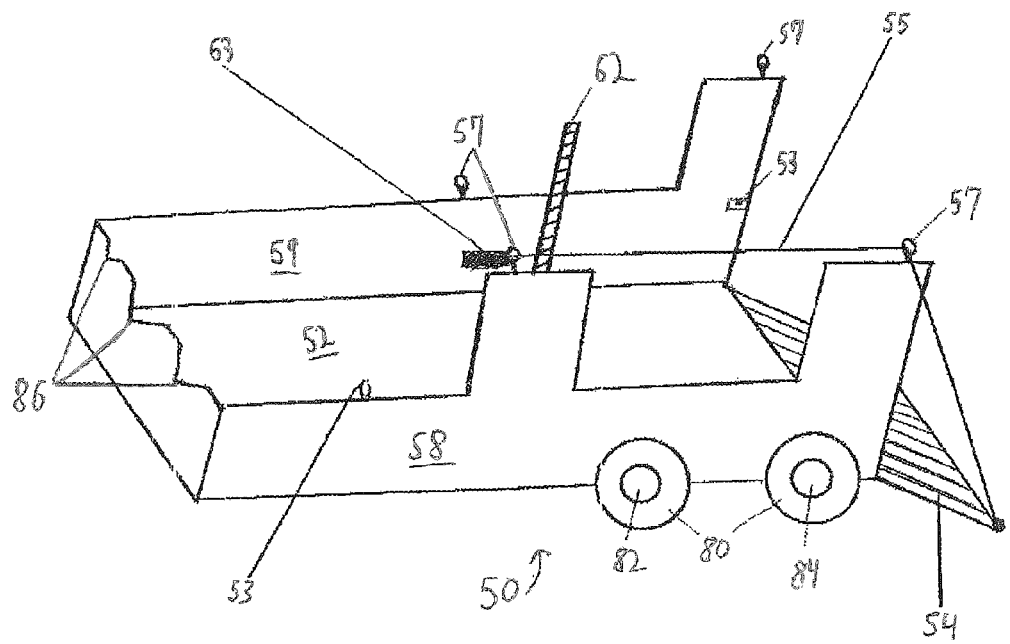
FIGS. 8*a-b* show perspective view of a caddy for a disabled rider adapted vehicle with an optional ramp raised and lowered.
Figure 8B:
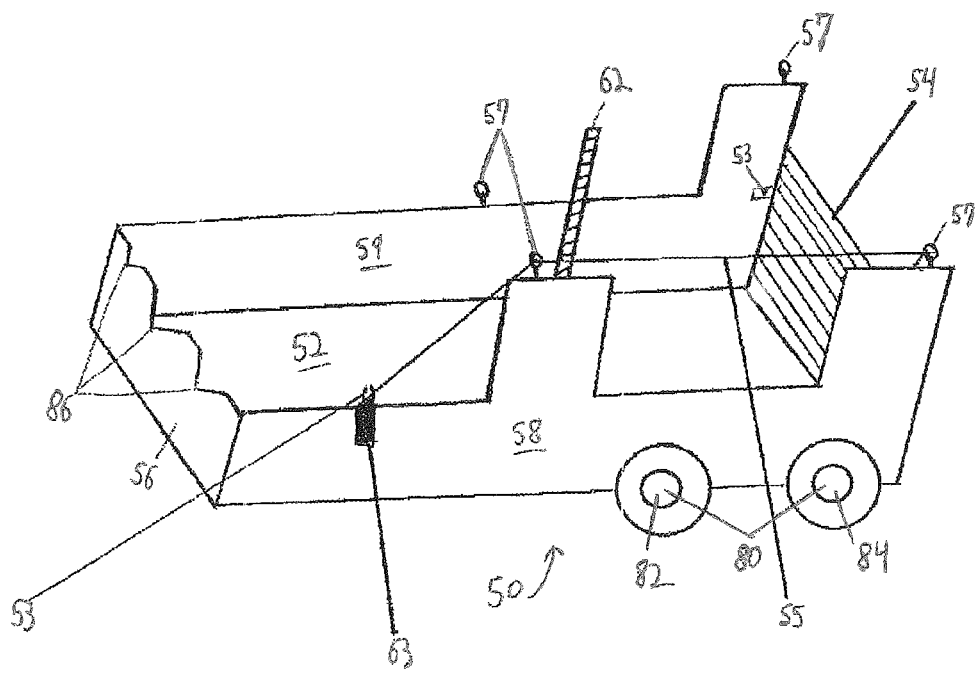
Figure 9A:
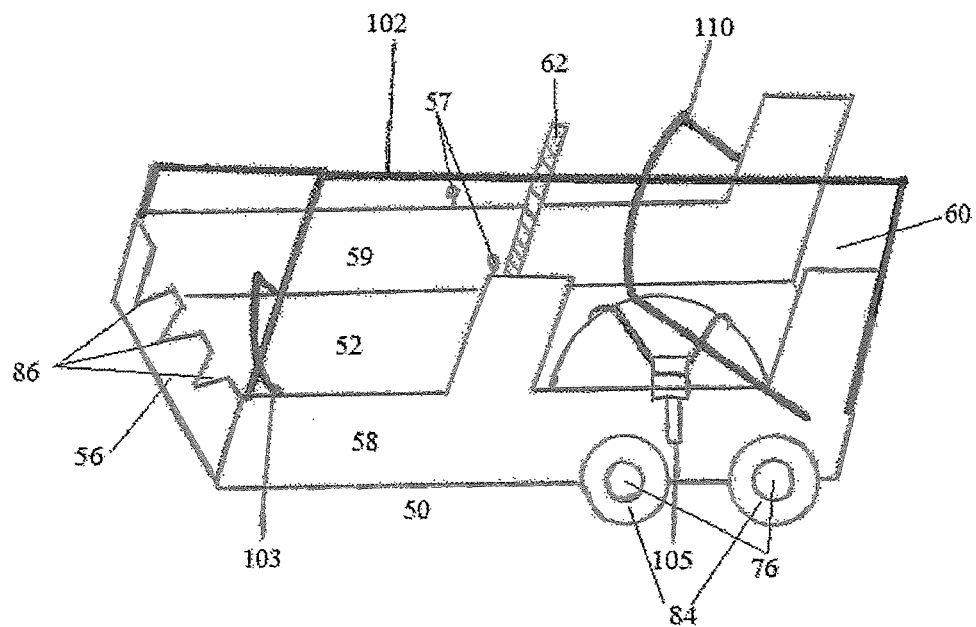
FIG. 9*a* is a close-up view of another embodiment of a modified caddy capable of carrying a passenger in a wheelchair according to the principles of the present disclosure.
Figure 9B:
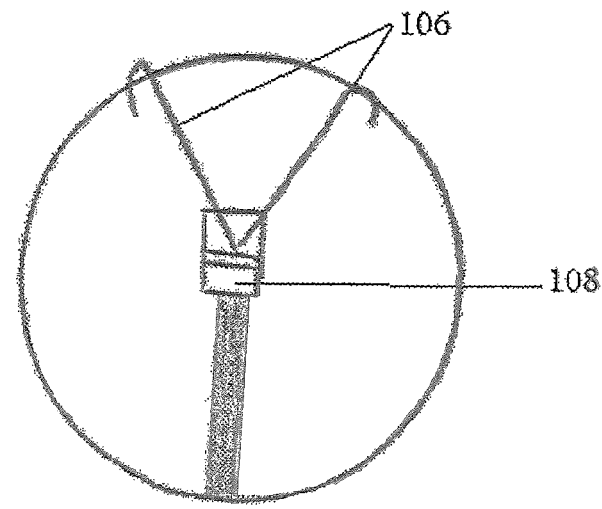
FIG. 9*b* is an exploded view of the securing mechanism of FIG. 9*a*.

Referring now to the drawings in detail, the present disclosure is generally directed to a system and method for facilitating use of vehicles such as motorcycles, scooters, and other, similar vehicles by disabled persons, and to an improved vehicle and caddy. In one example embodiment, as shown in FIGS. 1 and 5-7, the vehicle can comprise a disabled rider adapted cycle or scooter 10 ("DRAC"). The DRAC 10 can, therefore, include a conventional motorcycle or scooter combined with a series of augmentations that enable it to be used by a disabled rider in conjunction with a caddy 50 to transport the rider and his or her vehicle. As shown in FIGS. 1 and 5, the caddy 50 and DRAC 10 can be configured to allow a wheelchair user to easily transfer from their wheelchair 20 to a DRAC 10, substantially without assistance, and to ride the DRAC 10 while transporting their wheelchair 20, substantially without inconvenience beyond that experienced by an able-bodied person riding a conventional cycle.

In some embodiments, as illustrated by FIGS. 1, 4-5, and 8-12, the caddy 50 of the present disclosure can include an elongated base 52 that can be substantially rectangular, square, or any other suitable shape and that can be sized to receive and support wheelchairs of various sizes and configurations, including motorized chairs, other apparatuses, or the like. The caddy can include first and second side walls 58, 59 and front and rear portions 56, 60, at least one axle 76 supporting the base 52, and at least one wheel 84 mounted along the axle 76. A wheelchair securing mechanism 71 will be provided along and configured to releasably secure the wheelchair 20 on the base 50, and at least one connecting mechanism 37 will be mounted to the base 52, adjacent the outer side wall, and will be adapted to releasably connect the caddy 50 to the cycle 10.

The caddy 50 can be used with most types of conventional cycles. Some aspects of the present disclosure include a conversion process, which acts to convert a conventional cycle into a DRAC 10 capable of being used in conjunction with a caddy 50 as described herein. Various types of cycles may require slightly different adaptation for conversion to a DRAC 10. A more detailed description of the conversion process is provided below. Through the conversion process, the present disclosure can make a new use of conventional cycles by making them newly or more easily usable for paraplegics, amputees, and other disabled people.

For example, as indicated in FIG. 1, in one aspect of the present disclosure a DRAC can include a conventional cycle or scooter 11 that has been adapted for use by a disabled rider in conjunction with the caddy 50. The cycle 11 can include many features of a conventional scooter or cycle, including a frame 12, an engine 13, power and braking controls 17 (i.e. hand-operable gas and brake controls), steering controls 18 (e.g. handle bars), a seat 14, and front and rear wheels 19. The cycle 11 can also be provided with a complimentary connecting mechanism 35 mounted along a portion of the frame 12, for coupling with the connecting mechanism 37 of a caddy 50 or its frame 12 or can simply be engaged and connected by connecting mechanism 37 to the caddy 50 or its frame 12 to form a DRAC 10. The relative position of the seat portion 14 of the cycle 11 and connected caddy 50 substantially facilitates transfer of the rider from a wheelchair to the seat of the DRAC 10.

According to some embodiments, the front 56 and sides 58, 59 of the caddy 50 can be approximately the height of the footrests 24 of the wheelchair carried thereon. However, the front 56 and sides 58, 59 of the caddy can be otherwise configured without departing from the scope of the present disclosure. For example, according to some embodiments, the sides 58, 59 both rise up in the back 60 of the caddy 50, and the outer side 58 rises in the middle to support hoisting mechanism 62. The front 56 may have a pattern of V cut-outs 86 which allow the user's feet to go forward over the front 56 of the scooter caddy 50 while still securing the wheels of the user's wheelchair.

To use the caddy 50, the wheelchair user enters the open rear 60 of the caddy, e.g., by popping a "wheelie" and resting front wheels 22 of the wheelchair 20 on the caddy's base 52. Alternatively, the user may use an optional short ramp 54 to enter the open rear 60 of the caddy or can enter by any other loading method. The rider then pulls himself or herself out of the wheelchair, e.g., by using hoisting mechanism 62 and the frame 12 of the scooter 10. The hoisting mechanism 62 may include additional, optional features, such as a handle or the like which can rise from the middle of a side 58, 59 of the caddy 50. After the user pulls the wheelchair 20 all the way forward in the caddy 50 he or she may lock his or her wheelchair 20 in place.

The wheelchair 20 may be initially locked in place by engaging brakes 21. In some embodiments, the wheelchair can be further secured with a securing mechanism 71. In some embodiments, the securing mechanism 71 can include a ratcheting strap 72 and bungee cord 74. However, it will be apparent to one of ordinary skill in the art that the wheelchair could be otherwise secured, such as with wires, magnets, or pegs without departing from the scope of this invention. Once the wheelchair 20 is secure, the user may then "transfer" to the cycle or scooter seat 14. The hoisting mechanism 62 can provide a steady support for the user to grip during transfer.

In one embodiment, on the bottom portion of the caddy base 52 proximate the outer side 58 (the side of the caddy 50 distal or farthest from the cycle 10) can be a double rear axle 76 and rear wheels 82, 84. On the inner side 59 (the side of the caddy 50 proximate or closest to the cycle 10) the caddy 50 can be connected to the cycle by a connecting mechanism 38. In some embodiments, the connecting mechanism can include a plurality of perforated steel pipe pieces 78 attached to frame 12 of the cycle 10 using U-bolts 79, welding or any other appropriate connection technique. The caddy 50 may be supported by axles and wheels, e.g. by double rear axle 76. According to some embodiments, for example, 10-inch pneumatic tires 80 can be used. Also according to some embodiments, for example, the axles 76 of the rear wheels 82, 84 are separated by 14 inches and the end of the rearmost wheel 84 lines up with the rear axle 16 of the cycle 10.

The axle or axles 76 may be U-bolted, welded, or otherwise attached to the base 52 of the DRAC 10. In some embodiments, instead of being at right angles to the DRAC 10, it may be preferred that the axles 76 toe-in one degree toward the DRAC 10 to provide greater stability. However, the axles could toe-in at a greater or smaller angle, toe-out, or could be at a right angle without departing from the scope of this disclosure. Further, it will be apparent to one skilled in the art that the present invention may also be utilized with a single axle and wheel, or any other number of axles and wheels.

Notwithstanding, it will be apparent to one of ordinary skill in the art that the caddy 50 and cycle 10 could be connected in another fashion, such as being cast as a singular piece or by using other types of connectors 38, including ones made of different materials, without departing from the scope of this invention. Further, other configurations or sizes of tires, spacing between axles, or alignments of wheels are also possible without departing from the scope of this disclosure and will be apparent to one of ordinary skill in the art.

In the back of the caddy 50 next to the cycle 10, there can be a support mechanism or brake 87. According to some embodiments, the support mechanism or brake 87 is a rod 88 rotating on a bolt/axle 89 about an inch and a half from the end of the base 52. In one embodiment, the rod 88 is approximately twenty inches in length. The rod 88 can lie flat while the scooter 10 is moving, and the rider may reach down and rotate the rod so that it comes into contact with the surface of the ground below, thus supplying extra support to the base 52 or providing a braking effect. This facilitates the rider getting in or out, prevents warping of the frame, and can serve as an emergency brake. According to some embodiments, the support mechanism or brake 87 has a solid end. According to some embodiments, the support mechanism or brake 87 may have a spring and wheel mechanism 97 attached. However, it will be appreciated that the present disclosure may be utilized with a different length rod 88, a different configuration for the support mechanism or brake 87, or a different means of supplying extra support to the base or of supplying additional braking without departing from the scope of this disclosure.

Although most paraplegics and amputees are taught how to do wheelies in their wheelchairs as a mandatory part of rehabilitation and would likely have little to no trouble raising the front wheels 22 of their wheelchair 20 the inches necessary to rest the front wheels 22 on the base 52 of the caddy 50, there are always exceptions, and a small, optional ramp 54 can be used where a wheelie is not possible or practical. In some embodiments, the ramp 54 may be attached to the rear of the caddy 50. The ramp 54 may be a manual, hydraulic, electric, or another type of ramp. An example of a manual ramp according to one embodiment could include a lock or latch 53 and a cable 55 threaded through at least one eye hook 57 located on a side 58, 59 of the caddy 50.

To use the ramp 50 according to one embodiment, a user can approach the caddy 50, undo a lock latch 53, and use a linkage 55 to ease the ramp 54 down. To enter, the user can use the hoisting mechanism 62 and frame 12 of the scooter to pull his or her wheelchair 20 forward. Once the wheelchair 20 is in place, the user can use the linkage to raise the ramp 54 and the lock or latch 53 to secure the ramp 54. To exit, the rider may reach back and undo the latch 53, use the linkage 55 to ease down the ramp 54, and then exit holding the handle 62 and the frame 12 of the cycle 10. The linkage 55 may include a cable, string, or the like and a may have a tab or handle 63 for being gripped by the rider to facilitate using the hoisting mechanism 62. However it will apparent to one of skill in the art that raising and lowering of the ramp 54 could be achieved by other configurations without departing from the scope of this disclosure.

In some embodiments, the base 52 of the caddy is at a height of approximately equal to or less than four to five inches. At this height, most users are able to use the caddy 50 without the ramp 54. However, it will be appreciated that the height of the base 52 of the caddy 50 may be higher without departing from the scope of this disclosure. In embodiments with a higher caddy base 52, the ramp 54 may become needed for a larger number of riders.

Ballast, balance weights, or counterweights 90 may be added to the caddy 50. In some embodiments, the ballast 90 may be proximate the outer side 58 of the caddy 50, toward the front 56 and between the axles 76. The counterweights 90 may aid in safe turning, stability and control, and may prevent the outer side 58 from lifting during high-speed turns. In some embodiments, the cycle 10 is cambered in 2 degrees with respect to the caddy 50. In some embodiments, the total weight of counterweights 90 on the outer side 58 of the caddy 50 are approximately equal to slightly less than 10% of rider's weight.

The inventor's prototype has worked safely for thousands of miles at speeds up to 60-65 mph using counterweights 90 as described herein. However, it will be apparent to one of ordinary skill in the art that ballast, balance weights, or counterweights 90 can be otherwise configured, such as being located on a different part of the caddy or being integrally formed with the caddy base 52 or sides 56, 58, 59 without departing from the scope of this disclosure. It will be further appreciated by one of ordinary skill in the art the cycle 10 may be cambered in at a different angle, may be cambered out, or may be non-cambered with respect to the caddy 50 without departing from the scope of this disclosure.

To improve aerodynamics and to decrease weight, the caddy according to some embodiments may have cut-outs, holes, or apertures 97 in the base 52, front, 56, and/or sides 58, 59. However, it will be apparent that the cut-outs, holes, or apertures 97 may be otherwise configured or omitted without departing from the scope of this invention.

Because disabled riders are generally all different shapes and sizes, the rider may work with a therapeutic recreation specialist at a rehabilitation center to establish the safe amount of ballast, balance weight or counterweight 90. Further, therapeutic recreation specialists can provide training on how to safely operate a DRAC 10 and caddy 50. Thus, a DRAC 10 may be used by persons with various forms of disability.

A wheelchair 20 can be secured in the caddy 50 by a series of wheelchair securing mechanisms 71. According to some embodiments, the wheelchair 20 can be secured in the caddy 50 by applying the wheelchair's own pre-equipped brakes 21. According to some embodiments, the wheelchair 20 may be secured by a bungee cord 74 and a ratchet strap 72. The bungee cord 74 can extend across the wheelchair seat 26 and be attached to the caddy sides 58, 59. The ratcheting strap 72 can extend across the back of the wheelchair and be attached to the caddy sides 58, 59. However, it will be apparent that the wheelchair may be otherwise secured without departing from the scope of this disclosure.

The measurements of the caddy 50 according to some embodiments can be determined by the measurements of the wheelchair 20 it will carry. The caddy 50 may be sized according to the size of the wheelchair 20. The base 52 can be the length of the wheelchair 20 from the footrests 24 to the rear of the back wheelchair tire and can be around two inches wider than the wheelchair on either side. The front 56 and sides 58, 59 may be the height of the footrests 24 of the wheelchair 20 it carries, with a pattern of V-shaped gaps 86 on the front 56 through which the user's feet may protrude when entering or exiting. In other embodiments, the caddy 50 may be otherwise sized, and the gaps 86 may be otherwise shaped or omitted.

The caddy 50 according to some embodiments can include an indicator light or lights 98, such as a brake light or lights and/or a turn signal or signals. These indicator lights may be powered by wiring 99 connected to an electronic component of the cycle 10, by a battery installed in or on the caddy 50, or otherwise. It will be apparent the battery, generator, electric or gas engine or motor, and indicator lights could each be omitted or otherwise configured in any combination without departing from the scope of this disclosure.

According to some embodiments, the caddy 50 may be designed to carry the weight of the wheelchair and/or other lightweight items. However, many will desire the option of carrying a passenger. According to some embodiments, as will be described further, the caddy 50 may be designed to carry more weight and/or other, heavier objects alongside the DRAC, including, but not limited to, a passenger in a wheelchair.

In embodiments where more weight and/or other, heavier objects such as a passenger in a wheelchair 20 are carried by the caddy 50, additional wheelchair securing mechanism may be needed to allow a passenger to safely ride in the wheelchair 20 while the DRAC 10 is driven. As shows in FIGS. 9a-b, the additional wheelchair securing mechanism can include a metal 2-hook grappling hook 92 on each of the rear tires of the wheelchair for tightly ratcheting additional straps 94 on the front of the chair 20. In this way, the wheelchair 20 can be held securely in place even with a passenger. For additional safety and security, the sides 58, 59 of the caddy 50 may be raised or a guard rail may be provided. The grappling hook 92 and additional ratcheting straps 94 may be used in conjunction with an added seat belt 96 and footstraps 103 to secure the wheelchair 50 and rider in the caddy. However, it will be apparent to one of ordinary skill in the art that the wheelchair and rider may be may be otherwise secured without departing from the scope of this disclosure.

Figure 11:
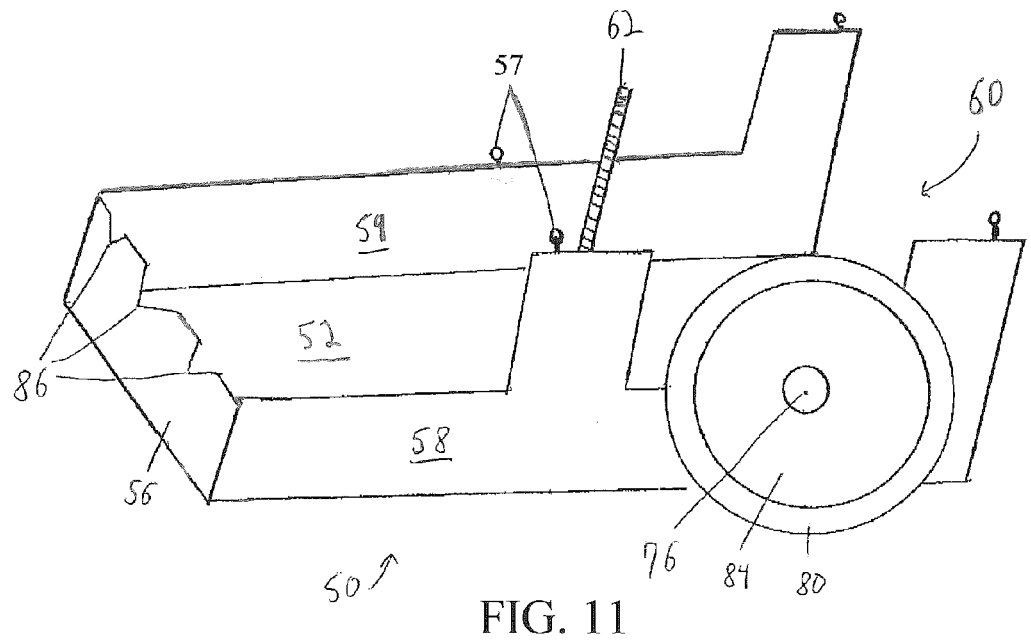
FIG. 11 is a close-up view of a modified caddy with a single axle according to another embodiment of the present disclosure.
Figure 12:
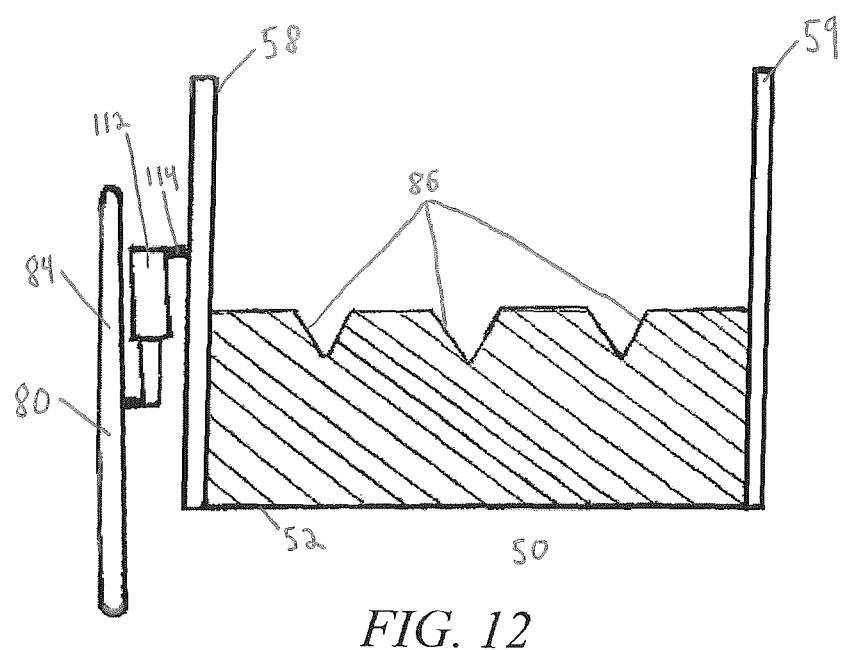
FIG. 12 is a close-up view of a modified caddy with an axle-less shock absorber.

Prototype caddies 50 were made of wood using bolts and U-bolts 79. However, such caddies 50 could be made with a variety of other materials or techniques, such as use of metal and welding. The use of metal and welding in some embodiments may facilitate use of a larger wheel or wheels 82, 84 and, correspondingly, a larger tire or tires 80 which can provide added control and stability. In some embodiments, as shown in FIG. 11 there can be one axle and one wheel on the outside 68 of the caddy 50, but, since the caddy may be utilized by disabled riders, a second axle and wheel may nonetheless be desired as a redundant safety and control mechanism. In some embodiments, as shown in FIG. 12 the wheel or wheels 82, 84 may be attached to a shock absorber or absorbers 112, which can be attached to a metal rod 114 connecting it to the base 52 of the caddy 50. However, it will be apparent to one of ordinary skill in the art that the wheels, axels, and shock absorbers may be otherwise numbered or configured without departing from the scope of this disclosure.

According to some embodiments, it may be desirous for the caddy to have a single-axle or axle-less construction. In one embodiment, the caddy 50 can have an axle-less design and can include a shock absorber or absorbers 112 coupled to the wheel or wheels 84 by coupling 114 to reduce shock when the caddy is moved, either on its own or by being attached to a moving DRAC 10.

Figure 10:
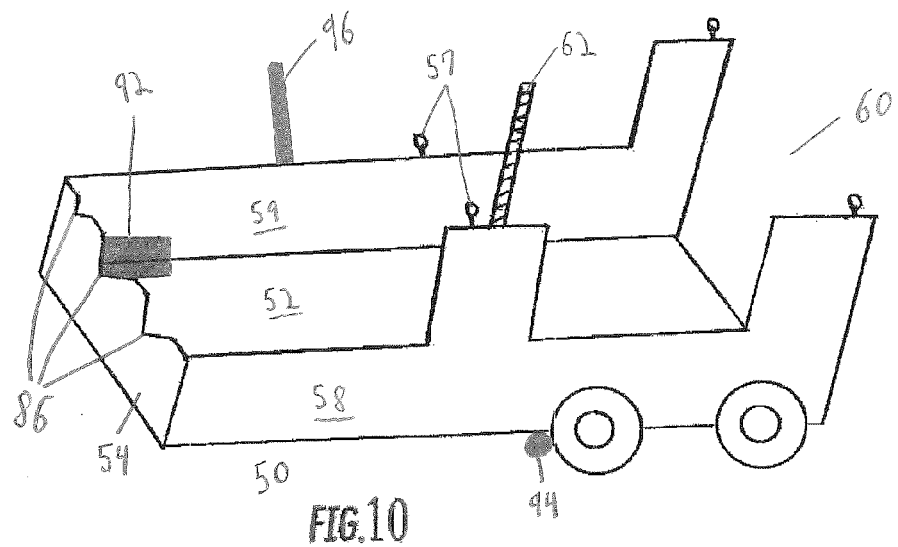
FIG. 10 is a close-up view of a modified caddy with a battery and motor according to another embodiment of the present disclosure.

In some embodiments, as shown in FIG. 10 the caddy 50 can be adapted to be independently mobile without being attached to a DRAC 10 and may include a power source and/or motor 92. The power source 92 can include a battery for powering a small engine or motor so that the caddy 50 can be driven a short distance, for example in an emergency situation, without using the motor or engine of the DRAC 10. Alternatively, the caddy of some embodiments may utilize a gas generator to power an electric motor or engine, or can use a gas motor or engine.

One embodiment of the caddy 50 can include a power source and motor 92 coupled to a power roller 94 that engages the tire or tires 80 of the caddy. Some embodiments may further include a lever 96 that may control engagement and disengagement of the tire or tires 80 by the power roller 94. However, it will be appreciated that the power roller 94 and lever 96 may be omitted or otherwise configured, and that the caddy 50 could be otherwise adapted to be mobile without departing from the scope of the present disclosure.

To convert a conventional cycle into a DRAC 10, a cycle can undergo a conversion process that makes it usable and accessible for paraplegics, amputees, or other disabled people. A DRAC 10 according to some embodiments may include five conversion elements: a padded console 38, walled footwells 30, restraining thigh straps 32, a fitted, padded backrest 34, and a lower ribcage restraining strap 36. An optional additional seatbelt 40 may also be included, as well as additional straps as redundant safety mechanisms. In addition to these five elements, a connecting mechanism 38 can be installed on the DRAC 10 and can include a complimentary connecting mechanism 35, and the caddy 50 may be attached to the DRAC 10 using the connecting mechanism 38. In some embodiments, the caddy 50 may be connected to the complimentary connecting mechanism 35 or the DRAC frame 12.

The DRAC according to some embodiments may have walled footwells 30 which keep the rider's feet in place and a restraining leg strap or straps 32 rising from the footwells 30. The straps may keep a user's legs in place and may be at thigh-height, or otherwise located or configured to keep a user's legs in place. In some embodiments, a secured foam rubber middle console 28 three to six inches wide fills the empty space between the seat 14 and the steering column 18 of the DRAC 10 to support and protect the user's legs from pressure sores. The seat 14 of some embodiments will have extra padding. In some embodiments the seat 14 has two to four inches of additional padding added. According to some embodiments, the fitted, padded backrest 34 will be attached to the frame 12 and will also have extra padding, for example, with two to four inches of additional padding added. In some embodiments, the rider can be secured to the backrest 34 by a lower ribcage restraining strap or straps 36. The strap or straps 36 can be connected to the rear of the frame 12 and may come across the bottom of the rider's ribcage to hold the rider secure against the backrest 34 while still allowing the shoulders and head to lean. In some embodiments, other means of securing the rider may be used, or the footwells, thigh straps, padded console, backrest and lower ribcage straps may be otherwise configured or omitted without departing from the scope of this invention.

With the use of footwells 30, the restraining leg or thigh strap or straps 32, the foam rubber middle console 28, the fitted padded backrest 34, and the lower ribcage restraining strap or straps 38 (and/or optional seat belt 40), a paraplegic or amputee is be able to ride safely on a DRAC 10 of the present disclosure while transporting an attached caddy 50 carrying a wheelchair 20. For additional safety and security, disabled riders may desire training and approval from their Physical Therapist or Therapeutic Recreational specialist prior to using a DRAC.

Although the footwells 30 of some embodiments may be substantially rectangular and walled, other configurations or types of footwells could also be used without departing from the scope of this disclosure. For example, screen-sided, solid-bottomed footwells 31 could be used, or any other variety of footwell suitable for keeping a rider's feet in place.

Certain conventional cycles 11, particularly certain types of scooters, come pre-equipped with the acceleration and braking on the handle bars and have an automatic transmission; they are literally "twist and go." As previously mentioned, one aspect of the present disclosure is a method of converting such a conventional cycle 11 into a DRAC 10. In one preferred embodiment that is particularly suitable for scooter-type cycles, this conversion process can include the following seven steps:

Add a padded console 28 between the rider's legs such that the padded console 28 extends from the scooter's steering column 18 to the scooter's engine housing and is tall enough to keep the rider's knees and legs apart to prevent pressure sores, Add walls 29 outside of the rider's feet, creating rectangular footwells 30 which keep the rider's legs safely in place, Add restraining leg or thigh straps 32 which keep feet and legs in place and help to provide balance, Add a well padded fitted backrest 34 for back support and to provide balance.

Add a lower ribcage restraining strap 36 firmly attached to the scooter's frame to provide support and balance, Attach a connecting mechanism 37, which may include one or more complimentary connectors 35 to the frame 12 of the scooter 10 using u-bolts, welding, or other appropriate technique, and Connect the caddy 50 to the connecting mechanism 37.

A handle bar brake strap 39 may be used to maintain engagement of the cycle brake controls 17 so that the apparatus remains stable when not in motion, such as during transfer. However, it will be apparent that the handle bar brake strap 39 may be omitted, and that the above conversion process may be performed with additional or omitted steps without departing from the scope of this disclosure. In some embodiments, the handle bar brake strap 39 includes a Velcro strap that may be wrapped tightly around the brake control and handlebar of the cycle and secured to keep the brake of the cycle engaged.

As previously mentioned, adapting some types of conventional cycles 11, particularly motorcycles, can create other additional challenges. Conversion kits which allow a user to move a motorcycle transmission to the handlebars are known and are often used to join the acceleration and braking on the handlebars so that a disabled rider can accelerate and brake. One aspect of the present disclosure is a conversion process to a conventional cycle 11, which can be a high-powered cycle such as a motorcycle that has been previously altered so that the transmission is located on the handlebars. For such types of cycles, a greater amount of heat and exhaust may be produced than for other types of cycles, such as scooters. In a preferred embodiment, the conversion process can include the following seven steps which may be particularly suited for motorcycle-type cycles:

Add large foam buttons to the cycle's gas tanks to protect the rider from pressure sores, Add rectangular enclosures which contain footwells 31 which keep the rider's legs safely in place, Add restraining leg or thigh straps 32 which keep feet and legs in place and help to provide balance, Add a well padded fitted backrest 34 for back support and to provide balance.

Add a lower ribcage restraining strap 36 firmly attached to the cycle's frame 12 to provide support and balance, Attach a connecting mechanism 37, which may include one or more complimentary connectors 35 to the frame 12 of the scooter 10 using u-bolts, welding, or other appropriate technique, and Connect the caddy 50 to the connecting mechanism 37.

In addition to the seven-step process described above, additional heat shielding 42 may also be necessary depending on the design and model of the cycle. Also, riders of certain types of cycles may desire to use an optional additional lap belt or seat belt 40 to feel more secure. In some embodiments, other additional securing means, such as straps, vests, or the like may also be used without departing from the scope of this disclosure. Further, it will be apparent that additional heat shielding 42 may be omitted and that the above conversion process may be performed with additional or omitted steps without departing from the scope of this disclosure.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. It therefore will be understood by those skilled in the art that while the present invention has been described above with reference to preferred embodiments, numerous variations, modifications, and additions can be made thereto without departing from the spirit and scope of the present invention as set forth in the following claims. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

Although the invention has been explained in relation to preferred embodiments, it is to be understood that many other possible modifications and variations can be made without departing from the spirit and scope of the invention as herein described. As such, the many features of the described embodiments may be selectively chosen or omitted to create new embodiments, without departing from the scope of this disclosure.

What is claimed is:

1. A caddy for enabling transport of a wheelchair by a cycle to which the caddy has been connected, the caddy comprising:

a base having first and second side walls and front and rear portions,
  the first and second side walls rising above the base,
  the first side wall being disposed on the same side as a cycle when the caddy is connected to the cycle,
  the second side wall being disposed on a side of the caddy opposite a cycle when the caddy is connected to the cycle,
  the first side wall including a first portion projecting upwards from the base a first distance and a second portion extending upwards from the base a second distance, the second portion being a rear portion, and the second distance being greater than the first distance,
  the second side including a third portion projecting upwards from the base a third distance, a fourth portion projecting upwards from the base a fourth distance, and a fifth portion projecting upwards from the base a fifth distance the fourth portion being a rear portion the fifth portion being a middle portion, and the fourth distance and the fifth distance each being greater than the third distance,
  at least one axle supporting the base,
  at least one wheel mounted along the axle,
  a wheelchair securing mechanism configured to releasably secure the wheelchair on the base, and
  at least one connecting mechanism mounted to the base and adapted to releasably connect the caddy to a cycle.

2. The caddy of claim 1, further comprising at least one handle having a free end rising from one or more of the first and second side wall and adapted to be gripped by a rider of the caddy for helping to pull a wheelchair into the caddy and for aiding the rider when transferring back and forth between a wheelchair on the base of the caddy and a cycle.

3. The caddy of claim 1, wherein the securing mechanism comprises a ratcheting strap or bungee cord.

4. The caddy of claim 1, wherein the at least one connecting mechanism comprises at least one perforated support projecting transversely from the base to a location adapted to engage a frame of the cycle, and a plurality of fasteners for coupling the support to the frame of the cycle.

5. The caddy of claim 1, wherein the at least one axle comprises a double rear axle.

6. The caddy of claim 1, further comprising a ramp movably mounted adjacent the front or rear portion of the base, a linkage connected to the ramp facilitating controlled raising and lowering of the ramp, and a latch for releasably securing the ramp in a raised position with respect to the base.

7. The caddy of claim 1, further comprising a brake.

8. The caddy of claim 1, further comprising an additional wheelchair securing mechanism and a passenger securing mechanism.

9. The caddy of claim 8, wherein the additional wheelchair securing mechanism includes a hook or ratcheting straps.

10. The caddy of claim 8 wherein the passenger securing mechanism includes one or more of a lap or seat belt, a guard rail, footstraps or an additional restraining strap or straps.

11. The caddy of claim 1, further comprising a power source and an engine or motor.

12. The caddy of claim 1, further comprising ballast, balance weight or counterweights or cut-outs, apertures or holes received in or integrally formed with the base, first side wall, second side wall, front portion, or rear portion of the caddy.

13. The caddy of claim 1 wherein the at least one axle toes-in one degree toward a cycle when the caddy is connected to the cycle.

14. The caddy of claim 1, wherein the first portion is approximately the same height as a footrest of the wheelchair when the wheelchair is secured on the base.

15. The caddy of claim 1, wherein the wheelchair securing mechanism comprises:
  a ratcheting strap or bungee cord that extends from the first side wall, across a seat portion of the wheelchair to the second side wall; and
  a ratcheting strap or bungee cord that extends from the first side wall, across a back portion of the wheelchair, to the second side wall.

16. The caddy of claim 15, wherein the wheelchair securing mechanism comprises:
  a ratcheting strap or bungee cord that extends from the fifth portion, across a seat portion of the wheelchair to the first side wall; and
  a ratcheting strap or bungee cord that extends from the fourth, across a back portion of the wheelchair, to the second portion.

17. The caddy of claim 2 wherein the connecting mechanism and the handle are positioned to facilitate transfer of a rider back and forth between a wheelchair on the base of the caddy and a cycle.

18. The caddy of claim 1, wherein the first distance and third distance are equal.

19. The caddy of claim 1, wherein the second distance and fourth distance are equal.

20. The caddy of claim 19, wherein the fifth distance is equal to the second distance and the fourth distance.

21. The caddy of claim 1, wherein the fifth portion is lower than a seat of the wheelchair when the wheelchair is secured to the caddy.

22. The caddy of claim 1, wherein the at least one connecting mechanism comprises at least one support welded to and projecting transversely from the base and a frame of the cycle.

23. The caddy of claim 1, wherein the at least one axle comprises a single rear axle.

24. A caddy for enabling transport of a wheelchair by a cycle to which the caddy has been connected, the caddy comprising:
  a base having first and second side walls and front and rear portions,
    the first and second side walls rising above the base,
    the first side wall being disposed on the same side as a cycle when the caddy is connected to the cycle,
    the second side wall being disposed on a side of the caddy opposite a cycle when the caddy is connected to the cycle, and
    the front portion of the base comprising an upwardly projecting panel and at least one cut-out configured in the panel to allow a rider's feet to go forward over the front of the caddy,
  at least one axle supporting the base,
  at least one wheel mounted along the axle,
    a wheelchair securing mechanism configured to releasably secure the wheelchair on the base, and
    at least one connecting mechanism mounted to the base and adapted to releasably connect the caddy to a cycle.

25. The caddy of claim 24, wherein the at least one cut-out comprises a series of generally V-shaped cut-outs cut outs.

26. A caddy for enabling transport of a wheelchair by a cycle to which the caddy has been connected, the caddy comprising:
  a base having first and second side walls and front and rear portions;

a cycle connecting assembly by which the caddy is attachable to a cycle adjacent the first side wall;
a wheelchair securing mechanism configured to releasably secure a wheelchair on the base;
at least one axle supporting the base; and
at least one wheel mounted along the axle, wherein
the first and second side walls rise above the base,
the first side wall including a first portion projecting upwards from the base a first distance and a second portion extending upwards from the base a second distance, the second portion being a rear portion, and the second distance being greater than the first distance,
the second side including a third portion projecting upwards from the base a third distance, a fourth portion projecting upwards from the base a fourth distance, and a fifth portion projecting upwards from the base a fifth distance, the fourth portion being a rear portion, the fifth portion being a middle portion, and the fourth distance and the fifth distance each being greater than the third distance, and
at least the first portion is approximately the same height as a footrest of the wheelchair when the wheelchair is secured on the base.

27. A caddy for enabling transport of a wheelchair by a cycle to which the caddy has been connected, the caddy comprising:
an inboard side;
an outboard side disposed opposite the inboard side;
a rear;
a cycle connecting assembly by which the caddy is attachable to a cycle adjacent the inboard side;
a base defining a wheelchair receiving zone and having at least a rider transfer side and a wheelchair entry side;
at least one axle supporting the base;
at least one wheel mounted on the at least one axle adjacent the outboard side; and
one or more wall segments defining a retention perimeter about at least a portion of the base,
wherein the one or more wall segments comprises:
a first transfer side wall segment positioned along the transfer side of the base and extending upwards from the base a first distance; and
a second transfer side wall segment extending upwards from the base a second distance, the second transfer side wall segment being rearward of the first transfer side wall segment, and the second distance being greater than the first distance.

* * * * *